US006959102B2

(12) United States Patent
Peck

(10) Patent No.: US 6,959,102 B2
(45) Date of Patent: Oct. 25, 2005

(54) METHOD FOR INCREASING THE SIGNAL-TO-NOISE IN IR-BASED EYE GAZE TRACKERS

(75) Inventor: Charles C. Peck, Newtown, CT (US)

(73) Assignee: International Business Machines Corporation, Armonk, NY (US)

(*) Notice: Subject to any disclaimer, the term of this patent is extended or adjusted under 35 U.S.C. 154(b) by 648 days.

(21) Appl. No.: 09/865,488

(22) Filed: May 29, 2001

(65) Prior Publication Data

US 2002/0181733 A1 Dec. 5, 2002

(51) Int. Cl.[7] .......... G06K 9/00
(52) U.S. Cl. .......... 382/103
(58) Field of Search .......... 382/115, 117, 291, 382/103, 274, 275

(56) References Cited

U.S. PATENT DOCUMENTS 5,016,282 A 5/1991 Tomono et al. .......... 382/117
5,608,528 A * 3/1997 Ogawa .......... 356/620
6,134,339 A * 10/2000 Luo .......... 382/115
6,603,137 B2 * 8/2003 Hochstein .......... 250/573
6,810,135 B1 * 10/2004 Berenz et al. .......... 382/118

* cited by examiner

*Primary Examiner*—Jose L. Couso
*Assistant Examiner*—Tom Y. Lu
(74) *Attorney, Agent, or Firm*—Greenblum & Bernstein P.L.C.; Stephen C. Kaufman

(57) ABSTRACT

The accuracy of eye gaze trackers is used in the presence of ambient light, such as sunlight, is improved. The intensity of sunlight and its constituent wavelengths of light, such as infrared radiation, do not vary rapidly. During the inter-frame interval of video cameras (typically 1/30th of a second), the level of ambient infrared radiation can be considered nearly constant. In a first embodiment, the modulation of the IR illuminator is synchronized with each frame of the camera such that the illuminator alternates between on and off with each subsequent frame. If one considers a sequence of such frames, then the image captured in the first frame contains both the illuminator signal and the ambient radiation information. The image captured in the second frame contains only the ambient radiation information. By subtracting the second frame from the first frame, a new image is formed that contains only the information from the illuminator signal. The resulting image can then be used by the conventional eye tracker system to compute the direction of eye gaze even in the presence of an ambient IR source.

21 Claims, 5 Drawing Sheets

METHOD FOR INCREASING THE SIGNAL-TO-NOISE IN IR-BASED EYE GAZE TRACKERS

BACKGROUND OF THE INVENTION

1. Field of the Invention

The present invention generally relates to eye gaze trackers and, more particularly, to techniques for improving accuracy degraded by ambient light noise while maintaining safe IR levels output by the illuminator.

2. Description of the Related Art

The purpose of eye gaze trackers, also called eye trackers, is to determine where an individual is looking. The primary use of the technology is as an input device for human-computer interaction. In such a capacity, eye trackers enable the computer to determine where on the computer screen the individual is looking. Since software controls the content of the display, it can correlate eye gaze information with the semantics of the program. This enables many different applications. For example, eye trackers can be used by disabled persons as the primary input device, replacing both the mouse and the keyboard. Eye trackers have been used for various types of research, such as determining how people evaluate and comprehend text and other visually represented information. Eye trackers can also be used to train individuals who must interact with computer screens in certain ways, such as air traffic controllers, nuclear energy plant operators, security personnel, etc.

The most effective and common eye tracking technology exploits the "bright-eye" effect. The bright-eye effect is familiar to most people as the glowing red pupils observed in photographs of people taken with a flash that is mounted near the camera lens. In the case of eye trackers, the eye is illuminated with infrared light, which is not visible to the human eye. An infrared (IR) camera can easily detect the infrared light re-emitted by the retina. It can also detect the even brighter primary reflection of the infrared illuminator off of the front surface of the eye. The relative position of the primary reflection to the large circle caused by the light re-emitted by the retina (the bright-eye effect) can be used to determine the direction of gaze. This information, combined with the relative positions of the camera, the eyes, and the computer display, can be used to compute where on the computer screen the user is looking.

Eye trackers based on the bright-eye effect are highly effective and further improvements in accuracy are unwarranted. This is because the angular errors are presently smaller than the angle of foveation. Within the angle of foveation, it is not possible to determine where someone is looking because all imagery falls on the high resolution part of the retina, called the fovea, and eye movement is unnecessary for visual interpretation.

However, despite the effectiveness of infrared bright-eye based eye tracking technology, the industry is highly motivated to abandon it and develop alternative approaches. This is deemed necessary because the infrared-based technology is not usable in environments with ambient sunlight, such as sunlit rooms, many public spaces, and the outdoors. To avoid raising concerns about potential eye damage, the amount of infrared radiation emitted by the illuminators is set to considerably less than that present in normal sunlight. This makes it difficult to identify the location of the bright eye and the primary reflection of the illuminator due to ambient IR reflections. This, in turn, diminishes the ability to compute the direction of eye gaze.

SUMMARY OF THE INVENTION

The present invention is directed to techniques for improving accuracy in the signal to noise ratio of an eye tracker signal degraded by ambient light noise. It enables the effective use of bright-eye based eye tracking technology in a wider range of environments, including those with high levels of ambient infrared radiation. Of course one way in which to do this would be to increase the intensity of the IR illuminator to overcome the ambient sunlight. However, this solution is not viable since increased IR radiation has associated health risks.

Instead, the invention exploits the observation that the intensity of sunlight and its constituent wavelengths of light, such as infrared radiation, do not vary rapidly. During the inter-frame interval of video cameras (typically 1/30th of a second), the level of ambient infrared radiation can be considered nearly constant.

The invention modulates the intensity of the illuminator with respect to time so that the illuminator signal may be extracted from the nearly constant ambient infrared radiation. The modulation of the illuminator is synchronized with the control of the camera/digitizing system to eliminate the need for pixel by pixel demodulation circuits. Several embodiments are disclosed for extracting the ambient IR (i.e., the noise) from the IR signal. In the first embodiment, the modulation of the IR illuminator is synchronized with each frame of the camera such that the illuminator alternates between on and off with each subsequent frame. A video frame grabber digitizes and captures each frame. If one considers a sequence of such frames, then the image captured in the first frame contains both the illuminator signal and the ambient radiation information. The image captured in the second frame contains only the ambient radiation information. By subtracting, pixel-by-pixel, the second frame from the first frame, a new image is formed that contains only the information from the illuminator signal. The resulting image can then be used by the conventional eye tracker system to compute the direction of eye gaze even in the presence of an ambient IR source. Other embodiments or variations are also disclosed for reducing ambient IR noise.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
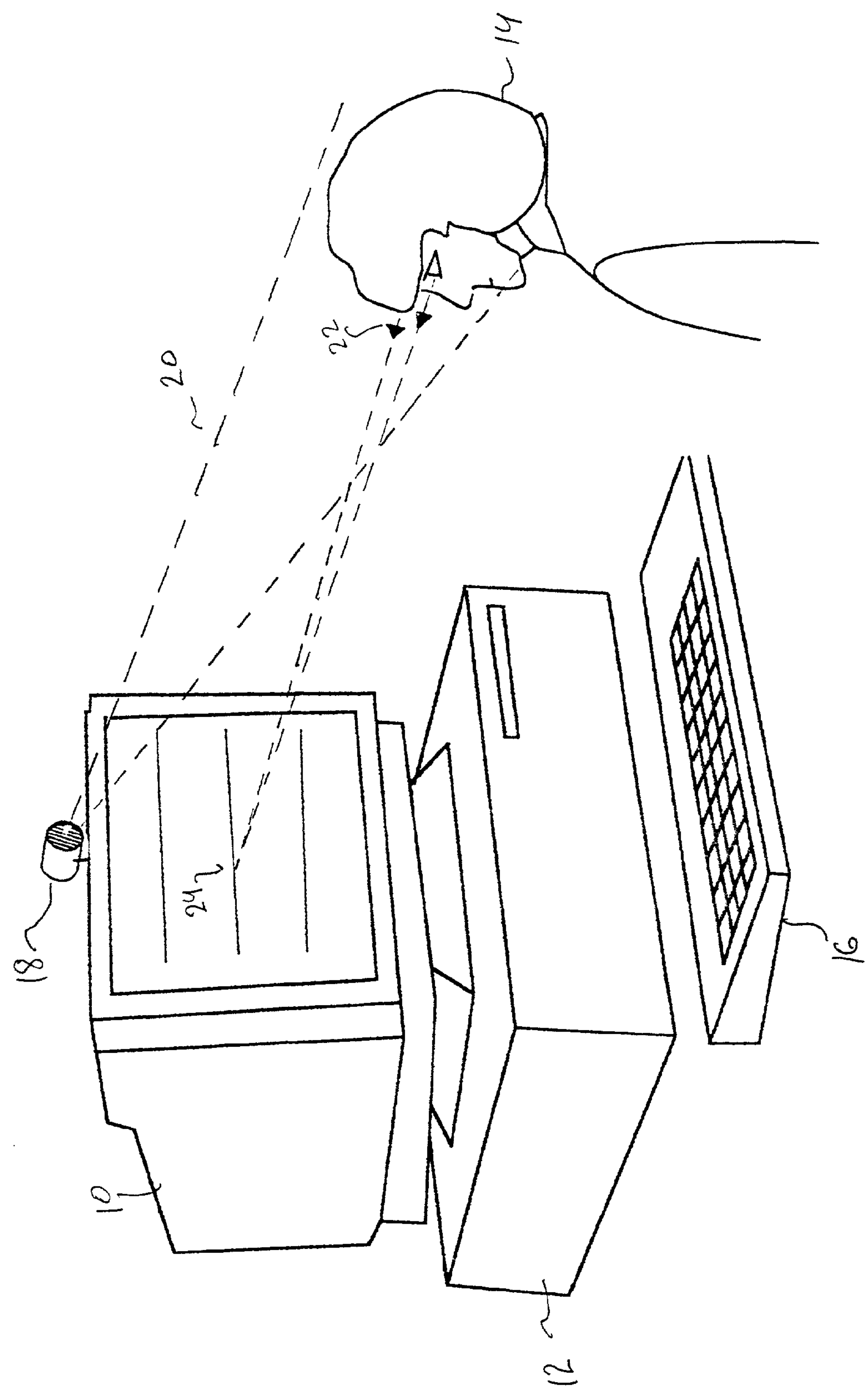
FIG. 1 is a diagram showing the basic set up of the eye gaze control system according to the present invention.

Referring now to the drawings, and more particularly to FIG. 1 there is shown a typical set up for the present invention. A display monitor 10 is connected to a computer 12 and positioned in front of a user 14. Traditional input devices such as a keyboard 16 or mouse (not shown) may also be present. However, in certain situations, the user may have physical constraints that render them unable to use traditional input devices. Therefore, the present invention provides an alternative to these traditional devices and would be useful for any individual capable of moving his or her eyes, including a quadriplegic or similarly disabled person. Although the user 14 is shown in a sitting position, the user could of course be lying down with the display 10 and eye tracker 18 positioned overhead or visible through an arrangement of mirrors.

An eye gaze tracker 18 is mounted and aimed such that the user's eyes 22 are in its field of vision 20. The eye is illuminated with infrared light. The tracker 18 detects the infrared light re-emitted by the retina. This information, combined with the relative positions of the tracker 18, the eyes 22, and the computer display 10, can be used to compute where on the computer screen the user 14 is looking 24.

Figure 2:
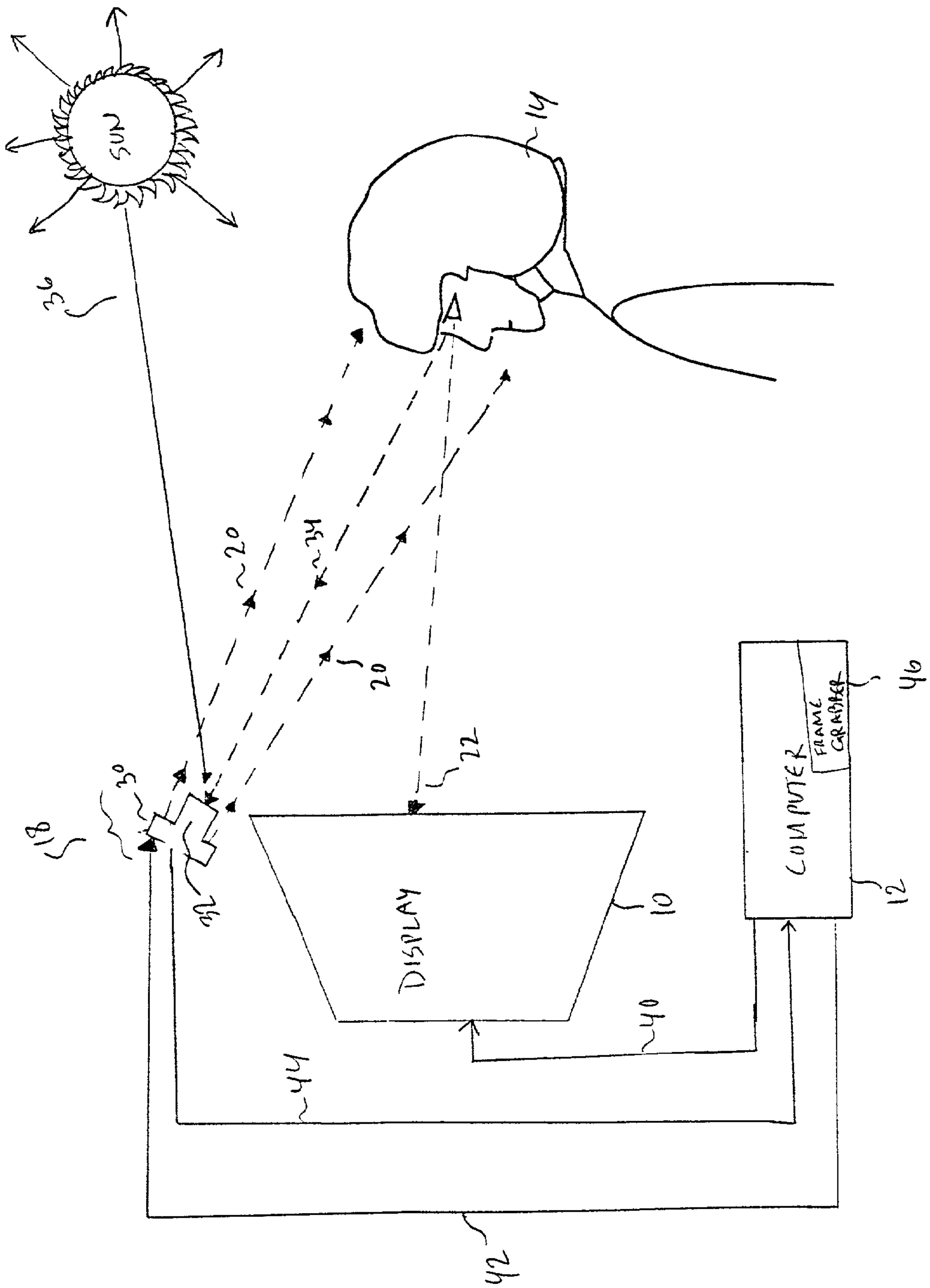
FIG. 2 is a diagram illustrating how ambient IR radiation effects the eye gaze control system.

As shown in FIG. 2, the computer 12 outputs a display signal 40 to control the images on the display 10. The eye gaze tracker 18 comprises an illuminator portion 30 and a camera 32. As shown, the illuminator 30 comprises a ring of IR sources around the camera 32 in the center of the ring. This ring-type arrangement is shown for example in U.S. Pat. No. 5,016,282 to Tomono et al. However, there are many arrangements of illuminator and camera that may be suitable for this application. The computer 12 supplies an illuminator signal 42 to control the output of the illuminator 30. The illuminator 30 illuminates the user's eye with a beam in IR light 20. The IR camera 32 can easily detect the infrared light re-emitted by the retina. It can also detect the even brighter primary reflection 34 of the infrared illuminator 30 off of the front surface of the eye. The reflection signal 44 from the camera 32 is fed back to the computer 12 for processing. However, as previously noted, in the presence of another IR light source, such as ambient sunlight 36, the reflection signal 44 includes not only information owed to the reflected illuminator light 34, but also noise caused by the ambient light 36. While the sunlight 36 is shown directly entering the camera 32, it will be appreciated by those skilled in the art that the ambient light picked-up by the camera 32 may also be sunlight or light from other sources reflected off of the subject 14, walls, ceilings, other objects in the room. Therefore, if there is appreciable ambient light, the signal-to-noise (S/N) will be low and the computer 12 may have difficulties in accurately detecting the position of the user's gaze position on the display 10.

The first embodiment of the present invention, exploits the observation that the intensity of sunlight and its constituent wavelengths of light, such as infrared radiation, do not vary rapidly. During the inter-frame interval of the camera 32 (typically 1/30th of a second), the level of ambient infrared radiation can be considered nearly constant. Therefore, the computer modulates the intensity of the illuminator 30 with respect to time. In this case, the modulation of the illuminator signal 42 is synchronized with each frame of the camera 32 such that the illuminator 30 alternates between on and off with each subsequent frame. A video frame grabber 46 digitizes and captures each frame. If one considers a sequence of such frames, then the image captured in the first frame contains both the illuminator signal and the ambient radiation information. The image captured in the second frame contains only the ambient radiation information. By subtracting, pixel-by-pixel, the second frame from the first frame, a new image is formed that contains only the information from the illuminator signal. The resulting image can then be used by the conventional eye tracker system to compute the direction of eye gaze. The process would then be repeated starting with the third frame. The resulting system would yield 15 eye gaze direction computations per second with a typical camera and frame grabber system.

Figure 3B:
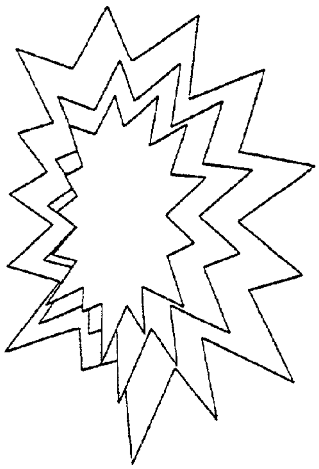
FIG. 3B is a diagram illustrating just the noise acquired by turning the illuminator off for a second frame.
Figure 3C:
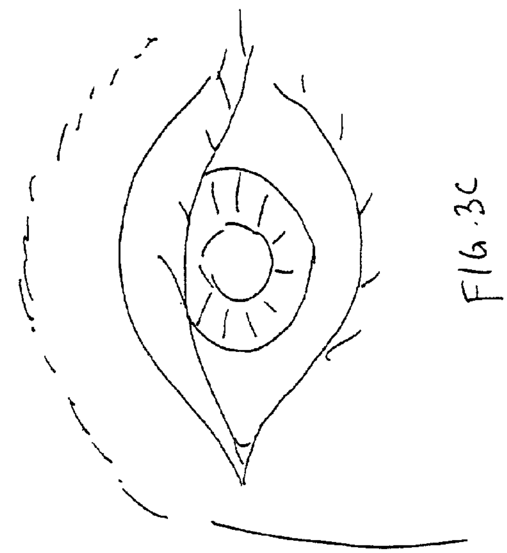
FIG. 3C is a diagram illustrating the reflection signal having an improved S/N ratio by subtracting the second frame from the first frame.
Figure 3A:
FIG. 3A is a diagram illustrating IR noise mixed with the reflection signal when the illuminator is turned on for a first frame.

Still referring to FIG. 2, this process is illustrated in FIGS. 3A–C. FIG. 3A represents the first frame in a sequence of frames. During this first frame, the illuminator 30 is turned on and is illuminating the user's eye with IR light. Due to ambient IR light in the room, reflection signal 44 comprises both the desired reflection signal 34, as well as the noise caused by the ambient light 36. In the second frame shown in FIG. 3B, the illuminator 30 is turned off and the camera only sees the ambient light or reflections caused by the ambient light 36. Therefore, the reflection signal 44 only contains the noise as illustrated in FIG. 3B. If a pixel by pixel subtraction is carried out, subtracting the image of FIG. 3B from the image of FIG. 3A, the resultant image, as shown in FIG. 3C will be that caused by the illuminator 30 which is substantially devoid of the ambient noise and can be used to compute the direction of eye gaze.

The embodiment described above is limited by two factors. The first is the combined signal to noise ratio of the infrared video camera 32 and the frame digitizer 46. This signal to noise ratio must be less than the signal to noise ratio of the illuminator signal to the ambient radiation. This limitation applies to all embodiments and is the fundamental constraint on the range of environments in which the system can be used.

The second factor is temporal resolution. As noted above, the first embodiment produces 15 eye gaze direction computations per second. This rate can be effectively doubled by subtracting each subsequent frame and taking the absolute value of the result. If the "absolute value" operator is not available, then it can be approximated by adjusting the manner in which subtraction is performed.

Consider the following example: first, assume that the illuminator is turned on during even numbered frames and off during odd numbered frames. At time 1, the first output image, $o_1$, is computed by subtracting frame 1, $f_1$, from frame 0, $f_0$. Thus, $o_1=f_0-f_1$. At time 2, the order of subtraction must be changed to avoid negative image values: $o_2=f_2-f_1$. At time 3, the original subtraction order is restored: $o_3=f_2-f_3$. The process continues indefinitely as follows: $o_4=f_4-f_3$, $o_5=f_4-f_5$, $o_6=f_6-f_5$, and so on. This can be expressed as $o_n=|f_n-f_{n-1}|$.

In this manner, up to 30 eye gaze direction computations per second are possible with typical camera and frame grabber systems. If a one frame period of delay is acceptable, temporal second order techniques for estimating noise or signal plus noise is possible. For example, at time 2, o1 would be produced as follows: $o1=|f1-(fO+f2)/2|$. This expression can be more generally written as $o_n=|f_n-(f_{n-1}+f_{n+1})/2|$.

Figure 4:
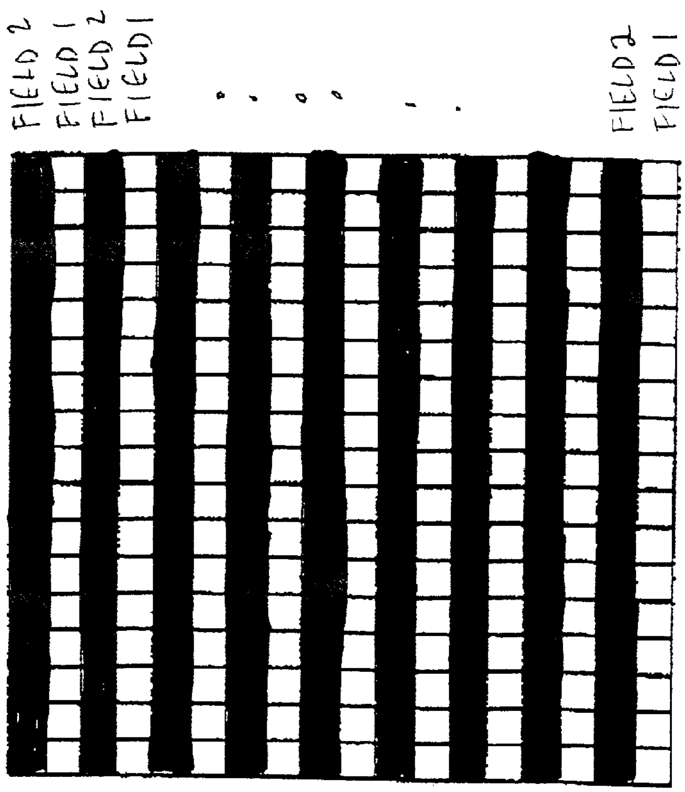
FIG. 4 is a diagram illustrating improving the S/N ratio by synchronizing the illuminator modulation for interleaved raster fields.

If even greater temporal resolution is required, it may be acquired at the expense of spatial resolution by synchronizing the illuminator 30 with the fields instead of the frames. To reduce the appearance of flicker most video camera standards use interleaving. As shown in FIG. 4 interleaving first scans the even numbered horizontal lines of a frame and then the odd numbered lines. In this manner the full height of the frame is scanned twice per frame, or typically once every 1/60th of a second. Each half of a frame scanned in this manner is called a "field" and each field has half the vertical resolution of a frame. In this case, the illuminator 30 is turned on during the scan of field 1 and turned off during the scan of field 2. Thus field 1 contains the actual reflection signal mixed with the noise signal and field 2 contains only the noise signal due to the ambient light. Subtracting raster lines in field 2 from adjacent raster lines in field 1 nearly eliminates the noise signal.

Figure 5:
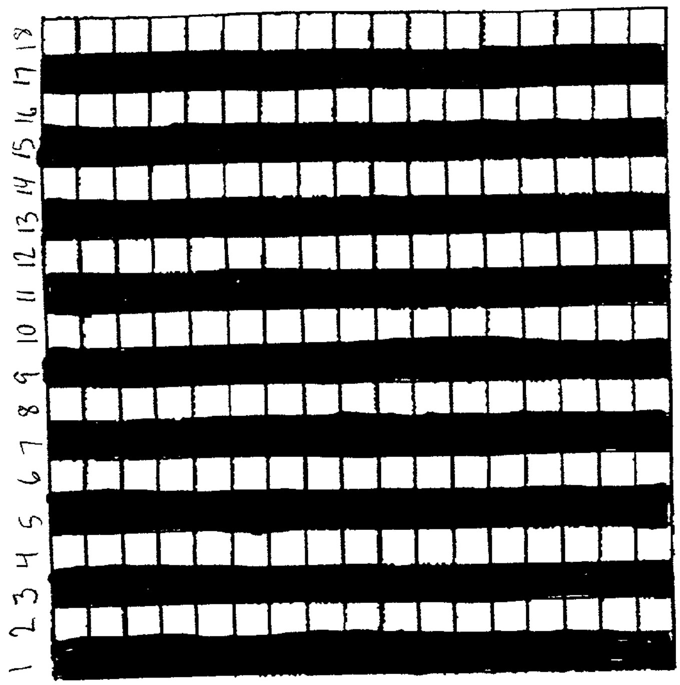
FIG. 5 is a diagram illustrating improving the S/N ratio by synchronizing the illuminator with the even and odd horizontal pixels.

As shown in FIG. 5, in the third embodiment, the computer synchronizes the illuminator 30 with the even and odd horizontal pixels. For example, the illuminator would be on for all even numbered horizontal pixels and off for the odd numbered horizontal pixels. This would effectively form alternating vertical stripes consisting of signal and noise or just noise information. The illuminator signal would be extracted by subtracting adjacent pixels from each other and taking the absolute value. Naturally, this modulation scheme would require an illuminator 30 capable of turning on and off many hundreds of times faster than required for the other schemes. This approach could be used with frames or fields.

Figure 6:
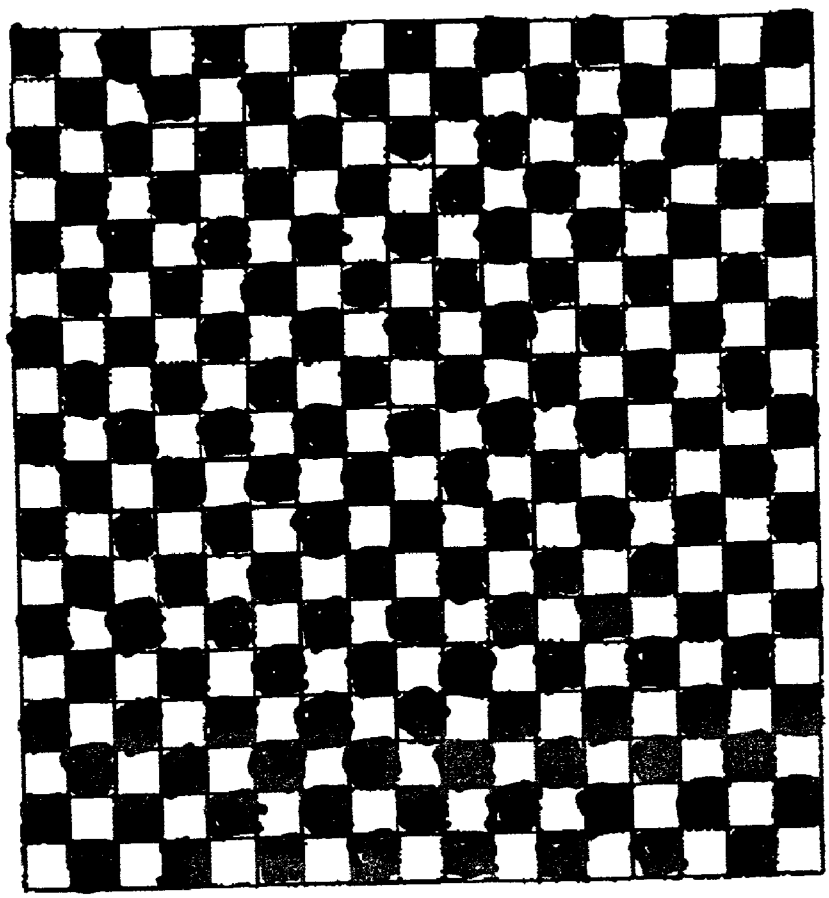
FIG. 6 is a diagram illustrating improving the S/N ratio by illuminating odd and even pixels in alternating interleaved raster fields forming a checkerboard pattern.

As shown in FIG. 6, the second and third modulation techniques shown in FIGS. 4 and 5 can also be combined to yield a checkerboard pattern of noise pixels and signal plus noise pixels with adjacent pixels being subtracted to yield a reflection signal having improved S/N characteristics.

Spatial and temporal second order techniques as described above could also be used for noise and signal plus noise estimation for any of the above embodiments.

In addition, this invention is preferably embodied in software stored in any suitable machine readable medium such as magnetic or optical disk, network server, etc., and intended to be run of course on a computer equipped with the proper hardware including an eye gaze tracker and display.

While the invention has been described in terms of a several preferred embodiments, those skilled in the art will recognize that the invention can be practiced with modification within the spirit and scope of the appended claims.

I claim:

1. A system for improving signal-to-noise ratio for an eye gaze tracker, comprising:

an illuminator for illuminating a user's eye with light radiation;

a camera for detecting an illuminator signal from said illuminator light radiation reflected from the user's eye and also detecting ambient light noise, said camera outputting an output signal;

means for synchronizing said illuminator to turn on with a first interval of said camera and turn off with a second interval of said camera;

means for digitizing said output signal and capturing a first image from said first interval having an illuminator signal portion and an ambient light noise portion and capturing a second image from said second interval having said ambient light noise portion; and means for subtracting said second image from said first image to produce an output image comprised of said illuminator signal portion, said output image being devoid of said ambient light noise portion.

2. A system for improving signal-to-noise ratio for an eye gaze tracker as recited in claim 1 wherein said first and second intervals comprise camera frames.

3. A system for improving signal-to-noise ratio for an eye gaze tracker as recited in claim 2 wherein said means for subtracting subtracts according to the expression $o_n=|f_n-f_{n-1}|$, where n is an integer$\geqq 0$, o is said output image, and f are said camera frames.

4. A system for improving signal-to-noise ratio for an eye gaze tracker as recited in claim 2 wherein said means for subtracting subtracts according to the expression $o_n=|f_n-(f_{n-1}-f_{n+1})/2|$, where n is an integer$\geqq 0$, o is said output image, and f are said camera frames.

5. A system for improving signal-to-noise ratio for an eye gaze tracker as recited in claim 1 wherein said first and second intervals comprise a first raster field and a second raster field, respectively, forming a horizontal stripe pattern.

6. A system for improving signal-to-noise ratio for an eye gaze tracker as recited in claim 1 wherein said first and second intervals comprise odd and even pixels forming one of a vertical stripe pattern and a checkerboard pattern.

7. A method for improving the performance of an eye gaze tracker system, comprising the steps of:

shining a modulated light on a user's eye during a first interval;

detecting said modulated light reflected from the user's eye and simultaneously detecting noise light from an ambient source during said first interval and producing a first data comprising a reflection portion and a noise portion;

turning off said modulated light during a second interval;

detecting said noise light from said ambient source during said second interval and producing a second data comprising said noise portion; and subtracting said second data from said first data to produce an output data comprising said reflection portion.

8. A method for improving the performance of an eye gaze tracker system as recited in claim 7 wherein said first interval and said second interval are camera frames.

9. A method for improving the performance of an eye gaze tracker system as recited in claim 8 wherein said subtracting step subtracts according to the expression $o_n=|f_n-f_{n-1}|$, where n is an integer$\geqq 0$, o is said output data image, and f are said camera frames.

10. A method for improving the performance of an eye gaze tracker system as recited in claim 8 wherein said subtracting step subtracts according to the expression $o_n=|f_n-(f_{n-1}-f_{n+1})/2|$, where n is an integer$\geqq 0$, o said output data, and f are said camera frames.

11. A method for improving the performance of an eye gaze tracker system as recited in claim 7 wherein said first interval and said second interval are odd and even pixels, respectively.

12. A method for improving the performance of an eye gaze tracker system as recited in claim 7 wherein said first interval and said second interval are first and second raster fields, respectively, forming a horizontal stripe pattern.

13. A method for improving the performance of an eye gaze tracker system as recited in claim 7 wherein said first interval and said second interval are alternating pixels forming one of a vertical stripe pattern and a checkerboard pattern.

14. A computer readable medium comprising software instructions for controlling an eye gaze tracker system to execute the steps of:

turning on an illuminator to shine at a user's eye during a first interval;

detecting said modulated light reflected from the user's eye and simultaneously detecting noise light from an ambient source during said first interval and producing a first data comprising a reflection portion and a noise portion;

turning off said modulated light during a second interval;

detecting said noise light from said ambient source during said second interval and producing a second data comprising only said noise portion; and subtracting said second data from said first data to produce an output data comprising said reflection portion.

15. A computer readable medium comprising software as recited in claim 14 wherein said first interval and said second interval are camera frames.

16. A computer readable medium comprising software as recited in claim 15 wherein said subtracting step subtracts according to the expression $o_n=|f_n-f_{n-1}|$, where n is an integer$\geqq$0, o is said output data, and f are said camera frames.

17. A computer readable medium comprising software as recited in claim 15 wherein said subtracting step subtracts according to the expression $o_n=|f_n-(f_{n-1}-f_{n+1})/2|$, where n is an integer$\geqq$0, o is said output data, and f are said camera frames.

18. A computer readable medium comprising software as recited in claim 14 wherein said first interval and said second interval are odd and even pixels, respectively.

19. A computer readable medium comprising software as recited in claim 14 wherein said first interval and said second interval are first and second raster fields, respectively forming a horizontal stripe pattern.

20. A computer readable medium comprising software as recited in claim 14 wherein said first interval and said second interval are alternating pixels forming one of a vertical stripe pattern and a checkerboard pattern.

21. A system for improving signal-to-noise ratio for an eye gaze tracker as recited in claim 1, wherein said means for subtracting said first image from said second image subtracts said first image from said second image pixel-by-pixel.

* * * * *